(12) United States Patent
Strid et al.

(10) Patent No.: US 9,238,188 B2
(45) Date of Patent: Jan. 19, 2016

(54) DISC FILTER

(75) Inventors: Kent Strid, Axmar (SE); Rolf Oswaldson, Gävle (SE)

(73) Assignee: Kadant Black Clawson Inc., Mason, OH (US)

( * ) Notice: Subject to any disclaimer, the term of this patent is extended or adjusted under 35 U.S.C. 154(b) by 361 days.

(21) Appl. No.: 13/704,409

(22) PCT Filed: Jun. 14, 2011

(86) PCT No.: PCT/SE2011/050733
§ 371 (c)(1),
(2), (4) Date: Jan. 14, 2013

(87) PCT Pub. No.: WO2011/159235
PCT Pub. Date: Dec. 22, 2011

(65) Prior Publication Data
US 2013/0105382 A1 May 2, 2013

(30) Foreign Application Priority Data
Jun. 16, 2010 (SE) .................................... 1000647-6

(51) Int. Cl.
*B01D 33/21* (2006.01)
*B01D 33/50* (2006.01)
*B01D 33/72* (2006.01)
(Continued)

(52) U.S. Cl.
CPC ................ *B01D 33/50* (2013.01); *B01D 33/21* (2013.01); *B01D 33/463* (2013.01); *B01D 33/72* (2013.01); *B01D 33/76* (2013.01)

(58) Field of Classification Search
None
See application file for complete search history.

(56) References Cited

U.S. PATENT DOCUMENTS

| 3,591,009 A | 7/1971 | Luthi | |
|---|---|---|---|
| 4,136,028 A | 1/1979 | Toivonen | |
| 5,705,068 A * | 1/1998 | Lukkarinen et al. | 210/331 |

(Continued)

FOREIGN PATENT DOCUMENTS

| CN | 201099799 | 8/2002 |
|---|---|---|
| CN | 1143722 | 3/2004 |

(Continued)

OTHER PUBLICATIONS

Office Action dated Mar. 28, 2014 for corresponding Chinese Patent Application No. 201180038841.6 and English translation thereof.

(Continued)

*Primary Examiner* — Benjamin Kurtz
(74) *Attorney, Agent, or Firm* — Wegman, Hessler & Vanderburg

(57) ABSTRACT

A disc filter for dewatering cellulose fiber suspensions comprising disc-shaped filter elements (11) carried by a rotor shaft (7) in order to rotate inside a vessel (2) while being partly immersed in a suspension received in the vessel. Each filter element comprises several filter sectors (12) distributed about the rotor shaft. Loosening members (25) are provided for loosening fiber material that has been filtered out of the suspension and deposited on a filtering lining (13) of the respective filter element. Receiver chutes (30) are located in the part of the vessel where the filter sectors (12) are rotated down into the suspension from a position above the suspension. The receiver chutes receive loosened fiber material together with flushing liquid from cleaning members (26) located above the receiver chutes to thereby allow the fiber material to be diluted in the receiver chutes to a desired dry content by means of this flushing liquid.

6 Claims, 4 Drawing Sheets

(51) Int. Cl.
    *B01D 33/76*    (2006.01)
    *B01D 33/46*    (2006.01)

(56) References Cited

U.S. PATENT DOCUMENTS 6,258,282 B1    7/2001    Strid et al.
6,283,306 B1 *  9/2001    Nilsson .......................... 210/391

FOREIGN PATENT DOCUMENTS

| DE | 3644275 A1 | 7/1988 |
|---|---|---|
| WO | WO 99/42195 A1 | 8/1999 |
| WO | WO 02/063095 A1 | 8/2002 |
| WO | WO 03/004131 A1 | 1/2003 |

OTHER PUBLICATIONS

International Search Report and Written Opinion mailed Sep. 29, 2011 for PCT/SE2011/050733 filed Jun. 14, 2011.
International Preliminary Report on Patentability mailed Jan. 3, 2013 for PCT/SE2011/050733 filed Jun. 14, 2011.
European Search Report and European Search Opinion issued Dec. 4, 2013 in European Patent Application 11796053.4.
European Invitation to File Search Results or a Statement of Non-Availability Pursuant to Rule 70b(1) issued Jul. 8, 2014 in European Patent Application 11796053A.

* cited by examiner

DISC FILTER

CROSS-REFERENCE TO RELATED APPLICATIONS

This application claims the priority filing benefit of International PCT Application PCT/SE2011/050733 filed Jun. 14, 2011 and published under PCT 21(2) in the English language, and Swedish Patent Application Serial No. 1000647-6 filed Jun. 16, 2010.

FIELD OF THE INVENTION AND PRIOR ART

The present invention relates to a disc filter according to the preamble of claim 1 for dewatering cellulose fibre suspensions.

Typical disc filters used in the pulp and paper industry for dewatering cellulose fibre suspensions are for instance disclosed in U.S. Pat. No. 4,136,028 A and U.S. Pat. No. 6,258,282 B1. A conventional disc filter of this type comprises a number of disc-shaped filter elements mounted on a rotatable rotor shaft in order to rotate together with the rotor shaft inside a vessel while being partly immersed in a cellulose fibre suspension received in the vessel. Each filter element comprises several filter sectors distributed about the rotor shaft. Each filter sector is provided with an external filtering lining and internal flow channels communicating with filtrate channels in the rotor shaft. When the filter elements are rotated, the filter sectors will move through the suspension in the vessel. As the filter sectors move through the suspension, water is sucked from the suspension, through the filtering lining on the filter sectors and into the flow channels inside the filter sectors, while fibre material is deposited as a fibre cakes on the external surfaces of said filtering lining. The filtrate comprising said water then flows from the flow channels in the filter sectors to the filtrate channels in the rotor shaft and is discharged from the vessel through a filtrate outlet. On continued rotation of the filter elements, the filter sectors will move upwards out of the suspension and the continued suction through the filtrate channels in the rotor shaft and the flow channels in the filter sectors will create an air flow through the fibre cakes deposited on the filtering lining of the filter sectors and into said flow channels. The filter sectors will then successively rotate past loosening members in the form of spray nozzles, which direct jets of water or any other suitable fluid towards the fibre cakes to thereby loosen the fibre cakes from the filtering lining of the filter sectors. The fibre material loosened from the filtering lining falls down into receiver chutes, which are located alongside of the filtering lining on each side of the respective filter element in the part of the vessel where the filter sectors are rotated out of the suspension after having moved through the suspension, i.e. on the side of the rofor shaft where the filter sectors move upwards during the rotation of the filter elements. At the bottom of the receiver chutes, the fibre material is picked up by a conveyor, for instance in the form of a screw conveyor, and passed on for further processing. After having rotated past the loosening members, the filter sectors are successively cleaned by means of flush liquid emitted from cleaning members in the form of spray nozzles before they are rotated down into the suspension for a new filtering cycle. The dry content, i.e. the dryness, of the fibre material obtained after the filtering process depends i.a. on the rotational speed of the filter elements and the fibre concentration in the suspension introduced into the vessel. The desired dry content of the fibre material obtained after the dewatering of a cellulose fibre suspension in a disc filter is typically in the order of 10-12% by weight.

SUMMARY OF THE INVENTION

The object of the present invention is to provide a disc filter of new and favourable design, which is suitable for dewatering of cellulose fibre suspensions of low dewatering resistance and relatively high fibre concentration without creating undue thickening of the suspension in the vessel of the disc filter.

According to the invention, this object is achieved by a disc filter having the features defined in claim 1.

The disc filter of the present invention is characterized in:
that the receiver chutes of the disc filter are located in the part of the vessel where the filter sectors, during the rotation of the rotor unit, are rotated down into the suspension from a position above the suspension;
that the cleaning members of the disc filter are located above the receiver chutes and configured to flush the fibre material loosened by the loosening members of the disc filter down into the receiver chutes by means of the flushing liquid that is emitted from the cleaning members and used for cleaning the filtering lining of the filter elements; and
that the receiver chutes are configured to receive said fibre material together with flushing liquid from the cleaning members to thereby allow the fibre material to be diluted in the receiver chutes to a desired dry content by means of this flushing liquid.

Thus, the receiver chutes of the disc filter according to the present invention are located on the side of the rotor shaft where the filter sectors are moving downwards while being cleaned and thereafter lowered into the suspension and not, as in the prior art disc filters of the type here in question, on the side of the rotor shaft where the filter sectors are moving upwards while being raised out of the suspension. This new position for the receiver chutes implies that the receiver chutes will receive not only the fibre material loosened from the filtering lining by means of the loosening members but also flushing liquid emitted from the cleaning members. The fibre material received in the receiver chutes is hereby diluted by the flushing liquid, which reduces the dry content thereof. However, this new position of the receiver chutes also implies that the fibre material will remain on the filtering lining during a longer part of the path travelled by the filter sectors in the air-filled space above the surface of the suspension in the vessel. This is due to the fact that the fibre material deposited on the filtering lining will be loosened from the filtering lining by the loosening members after having reached the side of the rotor shaft where the filter sectors are moving downwards and not, as in the prior art disc filters of the type here in question, on the side of the rotor shaft where the filter sectors are moving upwards. The fibre material is hereby subjected to a prolonged drying phase which will compensate for the above-mentioned dilution of the fibre material in the receiver chutes. By allowing the fibre material to be diluted in the receiver chutes by means of the flushing liquid from the cleaning members, the dry content of the obtained fibre material can be adjusted in a simple and efficient manner by varying the amount of flushing liquid that is allowed to flow into the receiver chutes. Furthermore, the dewatering efficiency of the disc filter is improved by the fact that a larger part of the filtering lining above the surface of the suspension in the vessel can be actively utilized in the dewatering process, which will increase the dewatering capacity of the disc filter.

Furthermore, by having the receiver chutes located on the side of the rotor shaft where the filter sectors are moving downwards into the suspension, the rotating filter elements will cause a suspension flow in the vessel directed from the narrower spaces between the receiver chutes and out into a wider space in the vessel free from any obstructing receiver chutes and not, as in the prior art disc filters of the type here in question, a suspension flow directed from a wider free space of the vessel into the narrower spaces between the receiver chutes. When a flow of a cellulose fibre suspension having a low dewatering resistance, i.e. a cellulose fibre suspension having a high CSF value (CSF=Canadian Standard Freeness), encounters a flow obstacle, there is a tendency towards the formation of thickenings in the suspension. By the new location of the receiver chutes, the receiver chutes will no longer form any obstacles for the suspension flow induced in the vessel by the rotating filter elements, and the tendency towards the formation of thickenings in the suspension in the vessel is thereby reduced.

In the prior art disc filters for dewatering cellulose fibre suspensions, where the receiver chutes are located on the side of the rotor shaft where the filter sectors are moving upwards out of the suspension, a considerable quantity of fibre material has already been deposited on the filtering lining when the filter sectors are rotated into the narrower spaces between the receiver chutes. If the receiver chutes are located too close to the filter elements, deposited fibre material will be torn off from the filtering lining by the frictional forces created in the spaces between the rotating filter elements and the stationary receiver chutes. The torn off fibre material will remain in the suspension in the vessel and cause undesired thickenings therein. This is particularly a problem when dewatering cellulose fibre suspensions having a low dewatering resistance. This problem can be avoided by increasing the interspaces between each filter element and the adjacent receiver chutes. However, this will result in a large and cost-ineffective disc filter. Said problem could alternatively be avoided by diluting the suspension that is to be introduced into the vessel of the disc filter to such a low fibre concentration that the layers of fibre material deposited on the filtering lining of the filter elements will be so thin that essentially no fibre material is torn off in the spaces between the rotating filter elements and the stationary receiver chutes. However, this will reduce the dewatering capacity of the disc filter and result in a cost-ineffective utilization thereof. By the new location of the receiver chutes on the side of the rotor shaft where the filter sectors are moving downwards into the suspension, the filter sectors are passing the narrower spaces between the receiver chutes at the beginning of the filtering cycle before any thicker layers of fibre material have been deposited on the filtering lining of the filter elements, and the above-mentioned problem with torn off fibre material is thereby eliminated or at least considerably reduced. Hereby, the fibre concentration of the suspension introduced into the vessel can be kept rather high and the interspaces between each filter element and the adjacent receiver chutes can be kept rather narrow, which is favourable with respect to the dewatering capacity and the compactness of the disc filter.

According to an embodiment of the invention, the inlet of the vessel comprises several inlet openings located in the part of the vessel where the filter sectors, during the rotation of the rotor unit, are rotated down into the suspension from a position above the suspension, the inlet openings being configured to introduce the suspension into the spaces between the receiver chutes. Hereby, the suspension introduced into the vessel is in a natural way allowed to follow the suspension flow induced in the vessel by the rotating filter elements and collisions between the suspension flow from the inlet of the vessel and the suspension flow induced in the vessel by the rotating filter elements are thereby avoided, which will reduce the tendency towards the formation of thickenings in the suspension in the vessel when dewatering cellulose fibre suspensions having a low dewatering resistance.

Another embodiment of the invention is characterized in:
that the inlet of the vessel comprises several inlet channels located in the vessel in the part of the vessel where the filter sectors, during the rotation of the rotor unit, are rotated down into the suspension from a position above the suspension, each inlet channel extending vertically alongside of one of said receiver chutes with the inlet channel located between the receiver chute and an adjacent part of the peripheral wall of the vessel; and
that said inlet openings are located at the upper part of the inlet channels to allow the suspension to flow from the inlet channels and into the spaces between the receiver chutes through these inlet openings.

Hereby, the inlet of the vessel is integrated in the vessel in a very space saving manner, while allowing an efficient distribution of the inflowing suspension to the spaces between the receiver chutes.

Further advantages as well as advantageous features of the disc filter according to the present invention will appear from the dependent claims and the following description.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

Figure 1:
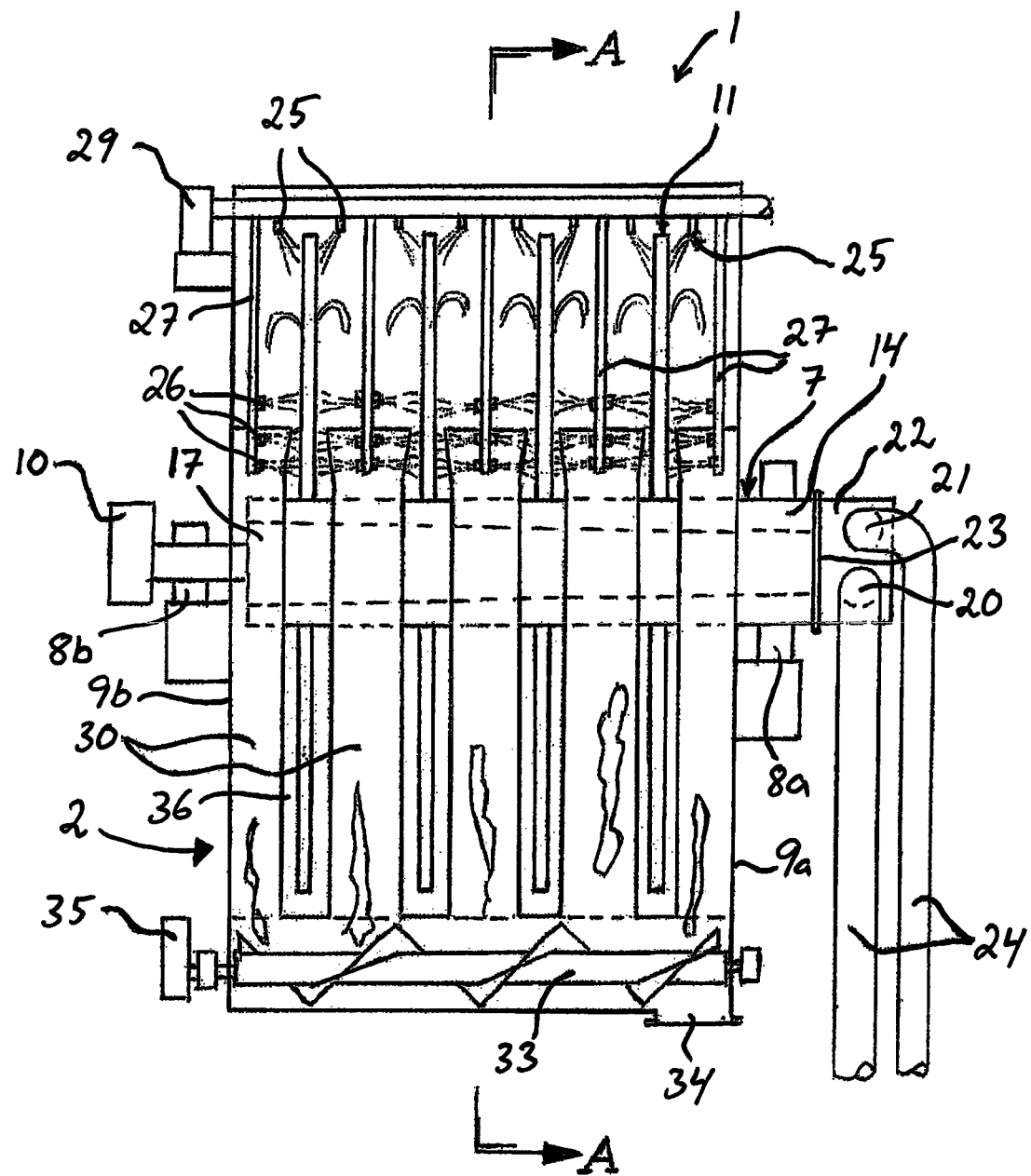
FIG. 1 is a schematic, partly cut lateral view of a disc filter according to an embodiment of the present invention.

The disc filter 1 of the present invention is designed to be capable of efficiently dewatering cellulose fibre suspensions having a low dewatering resistance, i.e. cellulose fibre suspension having a high CSF value, for instance in the order of 300-700 CSF. However, the disc filter 1 may of course also be used for dewatering cellulose fibre suspensions having a high dewatering resistance.

The disc filter 1 comprises a vessel 2 having an inlet 3 for introducing a cellulose fibre suspension into the vessel. The inlet 3 is connected to a conduit 4, through which the suspension is supplied to the inlet 3. The vessel 2 comprises a lower part 2a and an upper part 2b connected to the lower part. The lower part 2a has the character of a trough and is closed at the top by means of the upper part 2b, which has the character of a hood. Said upper and lower parts 2a, 2b together delimit an inner space of the vessel. In the illustrated example, the inner space of the vessel is accessible through an openable hatch 5 in the upper part 2b of the vessel.

A rotor unit 6 is located in the inner space of the vessel 2. The rotor unit 6 comprising a rotor shaft 7, which is rotatably mounted to the vessel 2 and extends across the inner space of the vessel. In the illustrated example, the rotor shaft 7 is rotatably mounted to the lower part 2a of the vessel through a first bearing 8a arranged at a first end of the rotor shaft and a second bearing 8b arranged at the other end of the rotor shaft. The rotor shaft 7 extends through sealed openings in the gable walls 9a, 9b of the vessel 2 and is rotated by means of a driving device 10, for instance in the form of a driving motor, which is connected to the rotor shaft 7.

The rotor unit 6 also comprises and number of disc-shaped filter elements 11 carried by the rotor shaft 7 in order to rotate together with the rotor shaft while being partly immersed in the suspension received in the vessel 2. In the illustrated example, the rotor unit 6 is provided with four such filter elements 11. Each filter element 11 extends at an angle, preferably perpendicularly, to the longitudinal axis of the rotor shaft 7, which longitudinal axis coincides with the axis of rotation of the rotor unit 6. Furthermore, each filter element 11 extends in an annular configuration about the rotor shaft 7 and is divided into several filter sectors 12 distributed about the rotor shaft. The filter sectors 12 of an individual filter element 11 are mutually separated by means of radially oriented partitions extending between the opposite lateral surfaces of the filter element. As shown, the filter sectors are separated by radially oriented partitions. However, the artisan can envision that the partitions can be arranged in a variety of positions other than radial, depending on cost factors and other desirable structurally equivalent orientations. As shown, each filter element 11 is provided with an external filtering lining 13 (illustrated by the screen pattern in FIG. 2) on its opposite lateral surfaces and internal flow channels (not shown), which communicate with filtrate channels 14 in the rotor shaft 7 in order to convey filtrate that passes through the filtering lining 13 to said filtrate channels 14.

It is noted that a variety of equivalent filtering lining dispositions may be used in addition to the external dispositions shown in the drawings.

Figure 2:
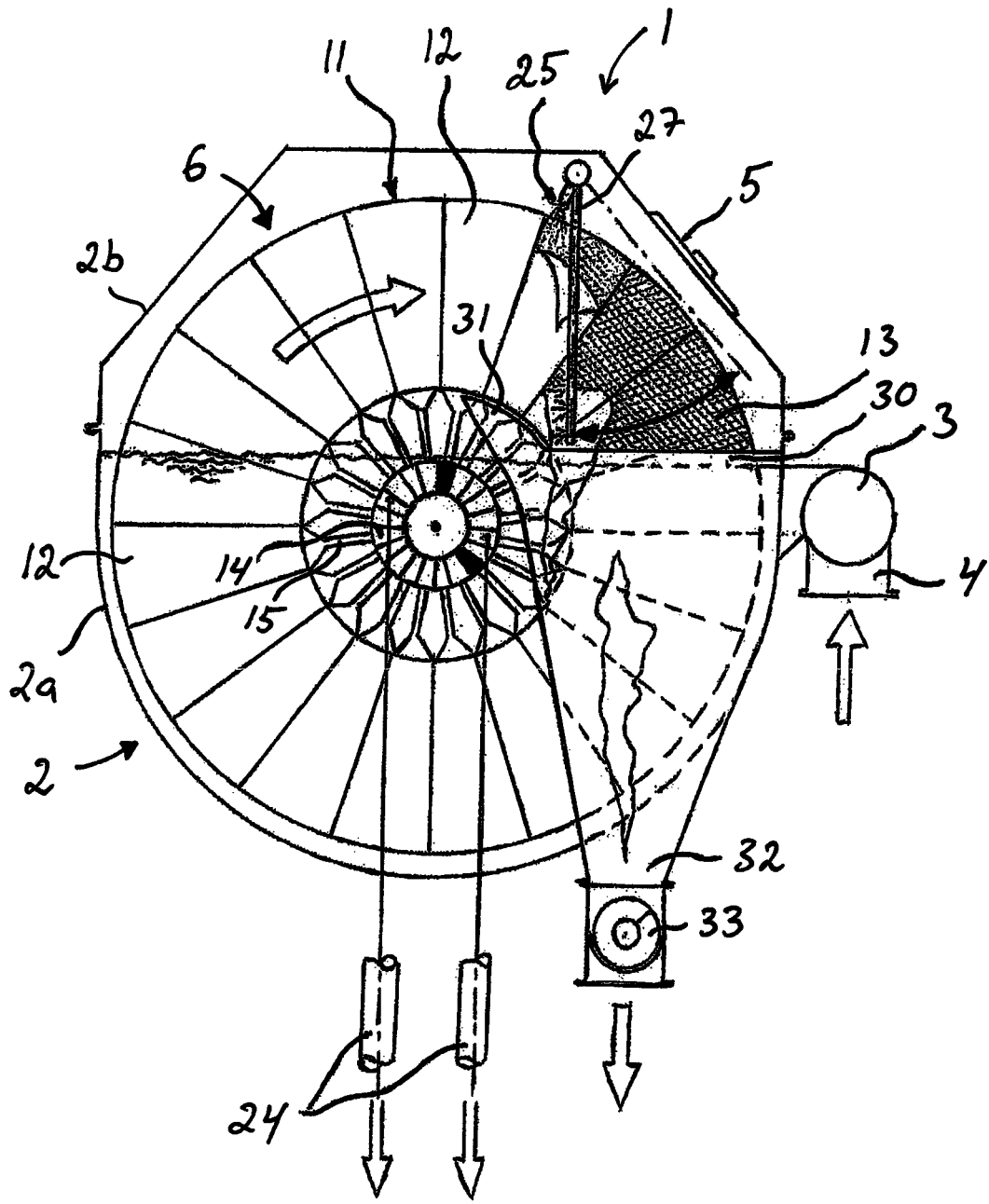
FIG. 2 is a cross-sectional view along the line A-A in FIG. 1.

As illustrated in FIG. 2, each individual filter sector 12 comprises a conduit section 15 for transferring the filtrate, i.e. the water filtered out of the suspension in the vessel 2, from the filter section 12 in question into an associated filtrate channel 14 in the rotor shaft 7 through an opening provided in the envelop surface of the rotor shaft between the conduit section 15 and the filtrate channel 14.

The filtrate channels 14 extend in the axial direction of the rotor shaft 7. These filtrate channels 14 have the character of sector shaped spaces mutually separated by means of radially oriented partition walls extending along the rotor shaft 7. The filtrate channels 14 are delimited in the radial direction inwards by a tubular core 17 of the rotor shaft 7. The tubular core 17 may have a varying diameter along the length of the rotor shaft 7, as illustrated in FIG. 1, with the smallest diameter at the end of the tubular core which is located at that end of the rotor shaft 7 where the filtrate passes out of the rotor shaft 7 in the axial direction thereof. In the illustrated example, two outlets 20, 21 are provided for the filtrate. A first outlet 20 is intended for a pre-filtrate (cloudy filtrate), whereas the other outlet 21 is intended for a clear filtrate. At least the clear filtrate outlet 21 and possibly also the pre-filtrate outlet 20 may be connected to a fall tube 24 intended to establish a vacuum in a suction head 22. This suction head 22 communicates with the filtrate channels 14 in the rotor shaft 7 through a filtrate valve 23. When the rotor shaft 7 rotates in relation to the filtrate valve 23 and the suction head 22, the filtrate valve 23 will bring the respective filtrate channel 14 in communication with the pre-filtrate outlet 20 or the clear filtrate outlet 21 depending on the prevailing rotational position of the rotor shaft 7.

The disc filter 1 is provided with loosening members 25 for loosening fibre material that has been filtered out of the suspension in the vessel 2 and deposited as a fibre cake on the filtering lining 13 of the respective filter element 11. In the illustrated example, these loosening members 25 consist of spray nozzles, which are configured to loosen the fibre material deposited on the filtering lining of the respective filter element 11 successively from one filter sector 12 at a time as the filter sectors of the filter element rotate past loosening members 25 arranged on the opposite sides of the filter element 11 and come within reach of the jets of water or any other suitable fluid emitted from these loosening members 25.

The disc filter 1 is also provided with cleaning members 26 for cleaning the filtering lining 13 of the respective filter element 11 by means of flushing liquid emitted from the cleaning members. The cleaning members 26 consist of spray nozzles, which are arranged on the opposite sides of the respective filter element 11 and configured to emit jets of water or any other suitable flushing liquid towards the filtering lining 13 on the opposite sides of respective the filter element. The cleaning members 26 are suitably mounted on pivotable carriers 27, which are configured to pivot to and fro in order to allow the cleaning members 26 to sweep over the filtering lining 13 of the respective filter element 11 during the rotation of the rotor unit 6. The carriers 27 are pivoted by means of a driving device 29, for instance in the form of a driving motor. In the illustrated example, the loosening members 25 are connected to the carriers 27 in order to make the loosening members 25 pivot together with the cleaning members 26. However, the loosening members 25 may alternatively be stationary. The cleaning members 26 are located after the loosening members 25 as seen in the rotational direction of the filter elements 11. Thus the respective filter sector 12 of a filter element 11 will rotate past the loosening members 25 and thereafter past the cleaning members 26 during the rotation of the filter element.

The disc filter 1 comprises a plurality of receiver chutes 30, each of which being provided with an inlet opening at the upper end for receiving the fibre material loosened from the filtering lining 13 of the adjacent filter elements 11. Each filter element 11 has a first receiver chute 30 located alongside of a part of the filtering lining 13 on a first side of the filter element and another receiver chute 30 located alongside of a part of the filtering lining 13 on the opposite side of the filter element. One receiver chute 30 is located in the space between each pair of adjacent filter elements 11 and in the space between the respective outermost filter element 11 on the rotor shaft 7 and the adjacent gable wall 9a, 9b of the vessel 2. The receiver chutes 30 are located in the part of the vessel 2 where the filter sectors 12, during the rotation of the rotor unit 6, are rotated down into the suspension from a position above the suspension, i.e. on the side of the rotor shaft 7 where the filter sectors 12 are rotated downwards after having been liberated from the fibre material and cleaned by the cleaning members 26. The inlet opening at the upper end of each receiver chute 30 is located above a horizontal plane extending through the longitudinal axis of the rotor shaft 7, and the lateral edges of said inlet opening extend closely to the filtering linings 13 of the adjacent filter elements 11 in order to efficiently catch the fibre material loosened from the filter sectors 12 of these filter elements. The lateral walls of each receiver chute 30 are with advantage diverging at the upper part of the receiver chute close to the inlet opening of the receiver chute, as illustrated in FIG. 1. Furthermore, each receiver chute 30 is with advantage provided with a part 31 at its upper end which is curved inwards into the area above the rotor shaft 7, as illustrated in FIG. 2, so to allow the inlet opening of the receiver chute to extend into this area.

The loosening members 25 and the cleaning members 26 are located above the receiver chutes 30 on the side of the rotor shaft 7 where the filter sectors 12 are rotated downwards towards the surface of the suspension in the vessel 2. The cleaning members 26 are configured to flush the fibre material loosened by the loosening members 25 down into the receiver chutes 30 by means of the flushing liquid emitted from the cleaning members. The receiver chutes 30 are configured to receive said fibre material together with flushing liquid from the cleaning members 26 to thereby allow the fibre material to be diluted in the receiver chutes 30 to a desired dry content by means of this flushing liquid. At the lower end 32, each receiver chute 30 is connected to a conveyor 33, which is configured to pick up the fibre material falling down through the receiver chutes and transfer this fibre material to an outlet 34, from which the fibre material is passed on for further processing. In the illustrated example, said conveyor 33 is a screw conveyor, which extends in parallel with the rotor shaft 7 and which is rotated by means of a driving device 35, for instance in the form of a driving motor.

When the filter elements 11 are rotated, the filter sectors 12 will be submerged into the suspension in the vessel 2 in the spaces 36 between the receiver chutes 30 and then move through the suspension to the opposite side of the rotor shaft 7, where the filter sectors 12 are rotated upwards out of the suspension. As the filter sectors 12 move through the suspension, water is sucked from the suspension, through the filtering lining 13 on the filter sectors 12 and into the flow channels inside the filter sectors, while fibre material is deposited as a fibre cake on the external surfaces of said filtering lining. The filtrate comprising said water then flows from said flow channels to the filtrate channels 14 in the rotor shaft 7 through the conduit sections 15 and is discharged from the vessel 2 through the suction head 22 and one of the filtrate outlets 20, 21. When the filter sectors 12 have been rotated upwards out of the suspension, the continued suction through the filtrate channels 14 in the rotor shaft 7 and the flow channels in the filter sectors will create an air flow through the fibre material deposited on the filtering lining 13 of the filter sectors and further on through the flow channels and into the filtrate channels 14. The fibre material deposited on the filtering lining 13 will be subjected to drying by this air flow. After having rotated past the angular position in which the filter sectors 12 are orientated vertically upwards, the filter sectors 12 will successively rotate past the loosening members 25, which loosen the fibre material from the filtering lining 13 of the filter sectors 12 by means of fluid jets directed towards the opposite lateral surfaces of the respective filter sector 12. Upon continued rotation of the rotor unit 6 the filter sectors 12 will then rotate past the cleaning members 26, which clean the filtering lining 13 of the filter sectors 12 by means of flushing liquid sprayed towards the opposite lateral surfaces of the respective filter sector 12. The fibre material loosened from the filtering lining 13 of the filter sectors falls down into the receiver chutes 30 together with flushing liquid from the cleaning members 26. At the bottom of the receiver chutes 30, the fibre material is picked up by the conveyor 33 and passed on for further processing. After having rotated past the cleaning members 26 and the upper ends of the receiver chutes 30, the filter sectors 12 are rotated down into the suspension again for a new filtering cycle.

The inlet 3 of the vessel 2 preferably comprises several inlet openings (not shown in FIGS. 1 and 2) located in the part of the vessel 2 where the filter sectors 12, during the rotation of the rotor unit 6, are rotated down into the suspension in the vessel from a position above the suspension, the inlet openings being configured to introduce the suspension into the spaces 36 between the receiver chutes 30. Said inlet 3 and its inlet openings are configured to make the suspension flow into the vessel 2 in a direction conforming to the rotational direction of the rotor elements 11.

Figure 3:
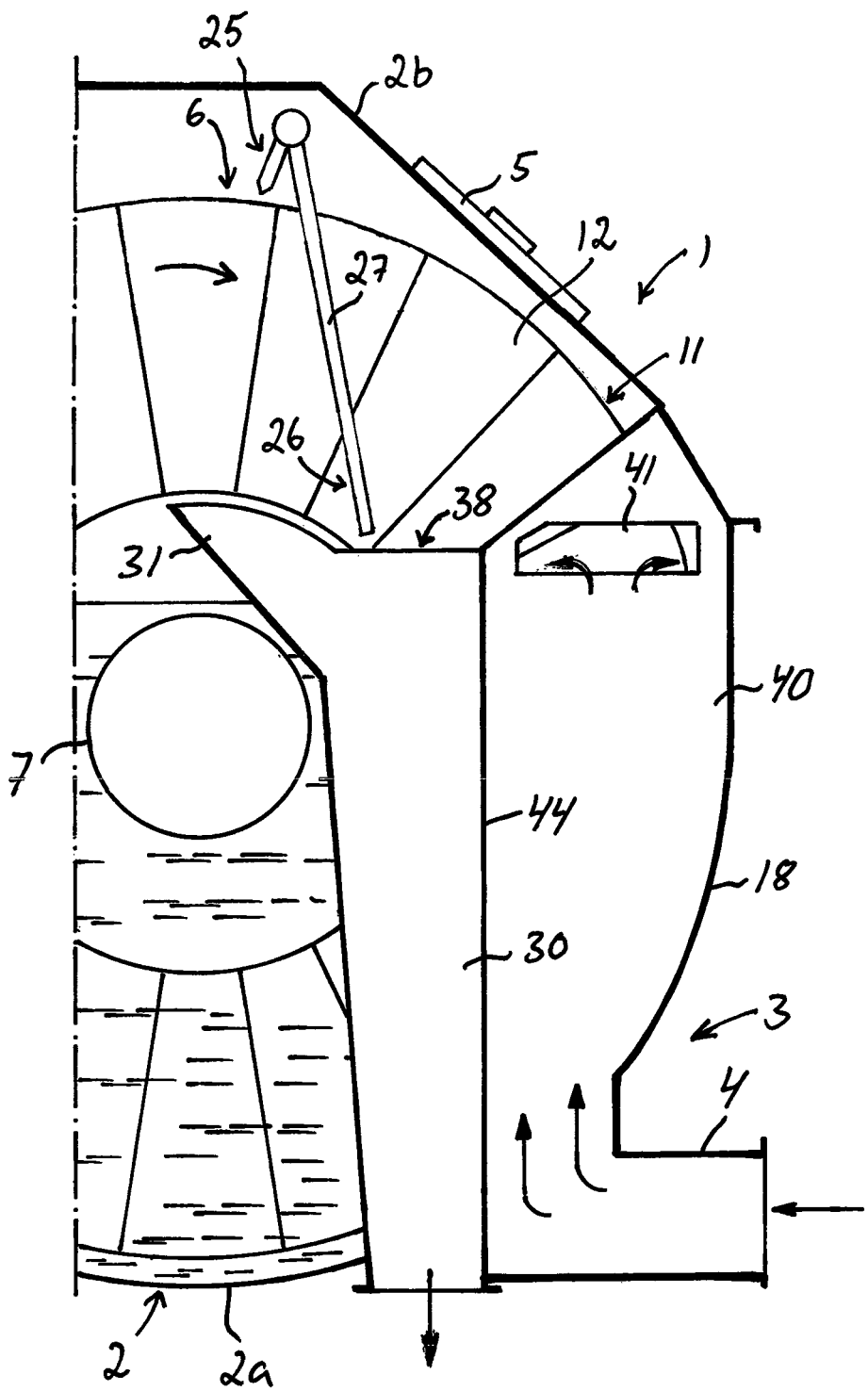
FIG. 3 is a schematic, partly cut lateral view of a part of a disc filter according to another embodiment of the invention.

In the embodiment illustrated in FIG. 3, the inlet 3 of the vessel 2 comprises several inlet channels 40, which are located in the vessel 2 in the part of the vessel where the filter sectors 12, during the rotation of the rotor unit 6, are rotated down into the suspension from a position above the suspension. Each inlet channel 40 extends vertically alongside of one of the receiver chutes 30 of the disc filter with the inlet channel 40 located between the receiver chute and an adjacent part of the peripheral wall 18 of the vessel 2. The respective inlet channel 40 is separated from the adjacent receiver chute 30 by a partition wall 44. The lateral walls 37 of the respective receiver chute 30 are flush with the lateral walls 42 of the associated inlet channel 40. The inlet channels 40 are connected to a conduit 4, through which the suspension is supplied to the inlet channels 40. Inlet openings 41 are located at the upper part of the inlet channels 40 to allow the suspension to flow from the inlet channels and into the spaces between the receiver chutes 30 through these inlet openings 41. These inlet openings 41 are provided in the opposite lateral walls 42 of the respective inlet channel above the surface of the suspension in the vessel. The upper end of each inlet channel 40 is covered by a slanting roof 43 in order to prevent flushing liquid from the cleaning members and loosened fibre material from falling into the inlet channel.

Figure 4:
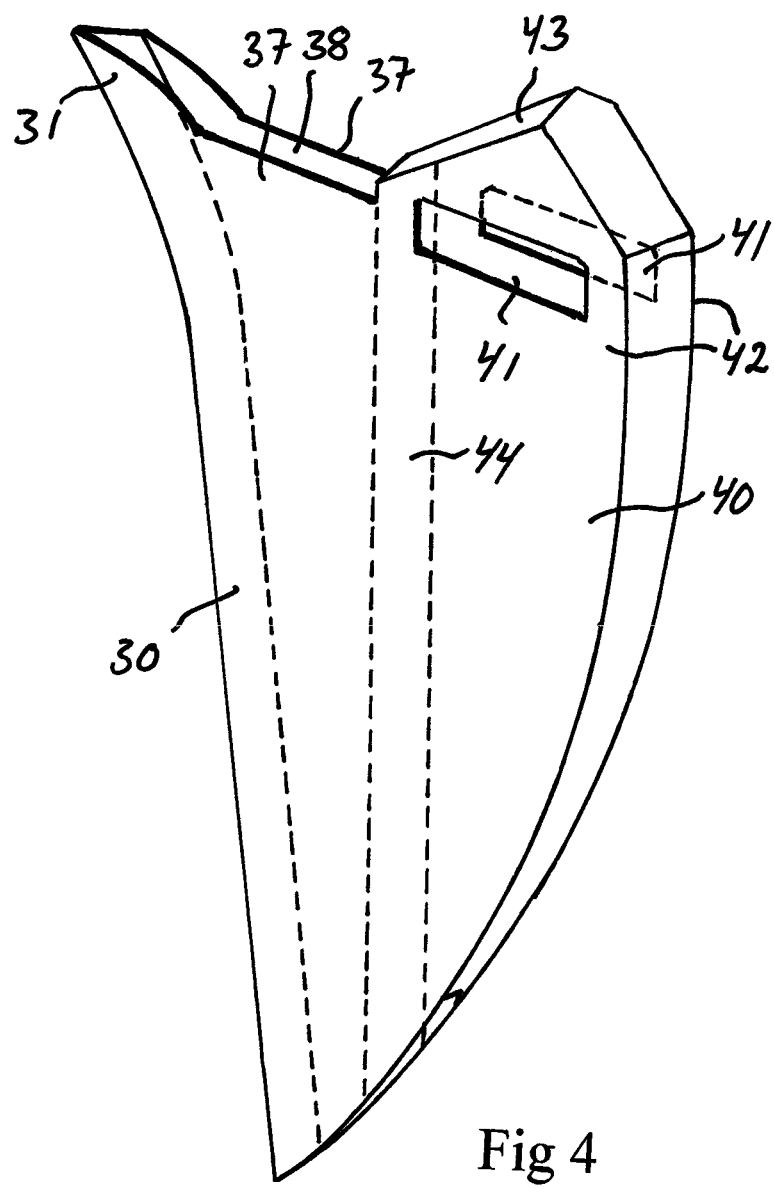
FIG. 4 is a schematic perspective view of a receiver chute and an adjacent inlet channel included in the disc filter of FIG. 3.

Each receiver chute 30 is open at the top, as illustrated in FIG. 4, in order to provide an inlet opening 38 for receiving the fibre material loosened from the filtering lining of the adjacent filter elements 11 together with flushing liquid from the cleaning members located above the receiver chute. In the embodiment illustrated in FIGS. 3 and 4, each receiver chute 30 is provided with a part 31 at its upper end which is curved inwards into the area above the rotor shaft 7 so to allow the inlet opening 38 of the receiver chute to extend into this area.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A disc filter for dewatering cellulose fiber suspensions comprising:
   a vessel (2) having an inlet (3) for introducing the suspension into the vessel;
   a rotor unit (6) located in the vessel (2), the rotor unit comprising a rotatable rotor shaft (7), which is provided with filtrate channels (14) extending axially therein, and one or more disc-shaped filter elements (11) carried by said rotor shaft (7) in order to rotate together with the rotor shaft while being partly immersed in the suspension received in the vessel, each filter element (11) extending at an angle to the longitudinal axis of the rotor shaft (7) and comprising several filter sectors (12) distributed about the rotor shaft, wherein each filter element (11) is provided with an external filtering lining (13) and internal flow channels communicating with said filtrate channels (14) in the rotor shaft in order to convey filtrate that passes through the filtering lining to said filtrate channels (14);

loosening members (25) for loosening fibre material that has been filtered out of the suspension and deposited on the filtering lining (13) of the respective filter element (11);

cleaning members (26) for cleaning the filtering lining (13) of the respective filter elements (11) by means of flushing liquid emitted from the cleaning members; and a plurality of receiver chutes (30), wherein each filter element (11) has a first receiver chute (30) located alongside of a part of the filtering lining (13) on a first side of the filter element and another receiver chute (30) located alongside of a part of the filtering lining (13) on the opposite side of the filter element;

characterized in:

that said receiver chutes (30) are located in the part of the vessel (2) where the filter sectors (12), during the rotation of the rotor unit (6), are rotated down into the suspension from a position above the suspension;

that said cleaning members (26) are located above the receiver chutes (30) and configured to flush the fibre material loosened by the loosening members (25) down into the receiver chutes (30) by means of said flushing liquid; and that the receiver chutes (30) are configured to receive said fibre material together with flushing liquid from the cleaning member (26) to thereby allow the fibre material to be diluted in the receiver chutes to a desired dry content by means of this flushing liquid, wherein said inlet (3) comprises several inlet openings (41) located in the part of the vessel (2) where the filter sectors (12), during the rotation of the rotor unit (6), are rotated down into the suspension from a position above the suspension, the inlet openings (41) being configured to introduce the suspension into the spaces (36) between the receiver chutes (30), and said inlet (3) and its inlet openings (41) are configured to make the suspension flow into the vessel (2) in a direction conforming to the rotational direction of the filter elements (11), said inlet (3) comprising several inlet channels (40) located in the vessel (2) in the part of the vessel where the filter sectors (12), during the rotation of the rotor unit (6), are rotated down into the suspension from a position above the suspension, each inlet channel (40) extending vertically alongside of one of said receiver chutes (30) with the inlet channel (40) located between the receiver chute and an adjacent part of the peripheral wall (18) of the vessel (2); and wherein said inlet openings (41) are located at the upper part of the inlet channels (40) to allow the suspension to flow from the inlet channels and into the spaces (36) between the receiver chutes (30) through these inlet openings (41), each said inlet channel having a roof (43) whereby said flushing liquid and said fibre material are prevented from falling into said inlet channels.

2. The disc filter according to claim 1, characterized in that the lateral walls (37) of the respective receiver chute (30) are flush with the lateral walls (42) of the associated inlet channel (40).

3. The disc filter according to claim 1, characterized in that the loosening members (25) consist of spray nozzles.

4. The disc filter according to claim 1, characterized in that the cleaning members (26) consist of spray nozzles.

5. The disc filter according to claim 1, characterized in that the cleaning members (26) are mounted on pivotable carriers (27), which are configured to pivot to and fro in order to allow the cleaning members (26) to sweep over the filtering lining (13) of the respective filter element (11) during the rotation of the rotor unit (6).

6. The disc filter according to claim 5, characterized in that the loosening members (25) are connected to said carriers (27) in order to make the loosening members (25) pivot together with the cleaning members (26).

* * * * *